United States Patent [19]

Macemon

[11] 4,037,961
[45] July 26, 1977

[54] SYSTEM AND APPARATUS FOR CONTOUR PLOTTING THE TOTAL LUMINESCENCE SPECTRUM OF A SAMPLE

[75] Inventor: James H. Macemon, Glen Burnie, Md.

[73] Assignee: Baxter Travenol Laboratories, Inc., Deerfield, Ill.

[21] Appl. No.: 702,495

[22] Filed: July 6, 1976

[51] Int. Cl.² .............................................. G01N 21/52
[52] U.S. Cl. ........................................ 356/85; 250/458;
250/461 R; 346/33 A; 356/96
[58] Field of Search ........................ 356/85, 96, 97, 98,
356/100; 250/458, 459, 461 R; 346/33 A

[56] References Cited

U.S. PATENT DOCUMENTS

| 3,563,656 | 2/1971 | Helms | 356/100 X |
| 3,975,098 | 8/1976 | West | 250/461 R X |

OTHER PUBLICATIONS

Wampler et al., "An On-Line Spectrofluorimeter System for Rapid Collection of Absolute Luminescence Spectra," *Applied Spectroscopy*, vol. 25, No. 6, Nov./Dec. 1971, pp. 623-627.

*Primary Examiner*—F. L. Evans
*Attorney, Agent, or Firm*—Henry W. Collins; Eugene M. Cummings

[57] ABSTRACT

A system for plotting the total luminescence spectrum of a sample comprises a spectrofluorometer including excitation and emission monochromator stages having operating wavelengths dependent on applied stepping pulses, and an X-Y plotter having a marking pen synchronized for movement along X and Y axis with changes in the wavelengths of the monochromators. A control circuit generates pulses to incrementally step the emission monochromator and horizontally scan the marking pen. A level detection circuit monitors the output of the spectrofluorometer and activates the pen upon attainment of a desired contour level. Limit circuitry incorporated in the control circuit momentarily actuates the excitation monochromator following each horizontal scan to increase the excitation wavelength for the subsequent emission scan to complete the plot.

4 Claims, 6 Drawing Figures

SYSTEM AND APPARATUS FOR CONTOUR PLOTTING THE TOTAL LUMINESCENCE SPECTRUM OF A SAMPLE

BACKGROUND OF THE INVENTION

The present invention is generally to spectrofluorometric systems, and more particularly to a system and apparatus for generating a contour plot of the total luminescence spectrum of a sample material.

Fluorescence spectroscopy, because of its high degree of sensitivity and specificity, has proven useful in many different fields for chemical identification of unknown substances. One field where this process has been particularly useful is in the field of environmental protection for tracing the source of water pollutants. Many types of water polluting material, such as oil spills, include naturally fluorescing components, such as polynuclear aeromatic hydrocarbons, which are particularly volatile or soluable and are therefore relatively stable to weathering. These components can be positively identified, or fingerprinted, even after a period of time in water.

To provide an identification, or fingerprint, of greater specificity, it has been proposed that the fluorescence intensity of a unknown sample be plotted as contours of equal amplitude against both excitation and emission wavelengths. Prior art methods and apparatus for generating such plots have either relied on computer analysis of fluorescence data collected at various wavelengths, requiring the use of a mini-computer and associated peripheral equipment, or have relied on time-consuming manual data collection and plotting procedures. Neither of these has been entirely satisfactory for use in environmental protection operations because of time and equipment considerations.

The present invention is directed to a method and apparatus for generating a contour plot utilizing a spectrofluorometer and plotter of conventional design and construction and with a minimum of additional apparatus.

SUMMARY OF THE INVENTION

The invention is directed to a system for producing a two-dimensional contour plot of the total luminescence spectrum of a sample. The system comprises excitation means including a monochromator having a variable operating wavelength dependent on applied pulses for generating a source of monochromatic light for application to the sample, and emission detection means including a monochromator having a variable operating wavelength dependent on applied pulses for generating an output signal dependent on the amplitude of flourescent light emitted from the sample. An X-Y plotter including a marking pen responsive to an applied control effect and X and Y axis positioning means is provided in conjunction with synchronization means coupled between the monochromators and positioning means synchronizing the position of the pen on the plotter with the operating wavelength of the monochromators, and pen control means responsive to the presence of a predetermined level at the output of the emission means for actuating the pen. In operation one of the monochromators is caused to scan through a predetermined range of wavelengths and the other monochromator is incrementally advanced upon completion of each such scan to form the desired contour plot.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements and in which:

DESCRIPTION OF THE PREFERRED EMBODIMENT

Figure 1:
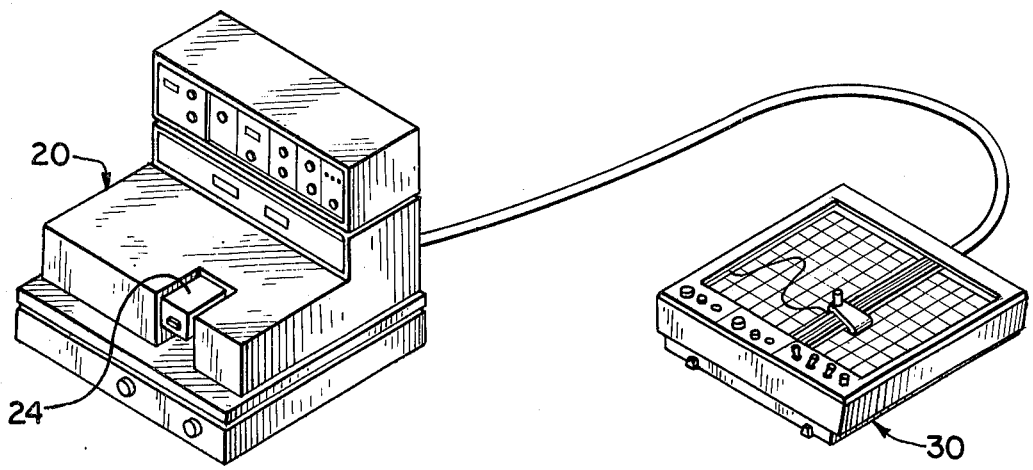
FIG. 1 is a perspective view of a spectrofluorometer and plotter incorporating the apparatus and system of the present invention.
Figure 2:
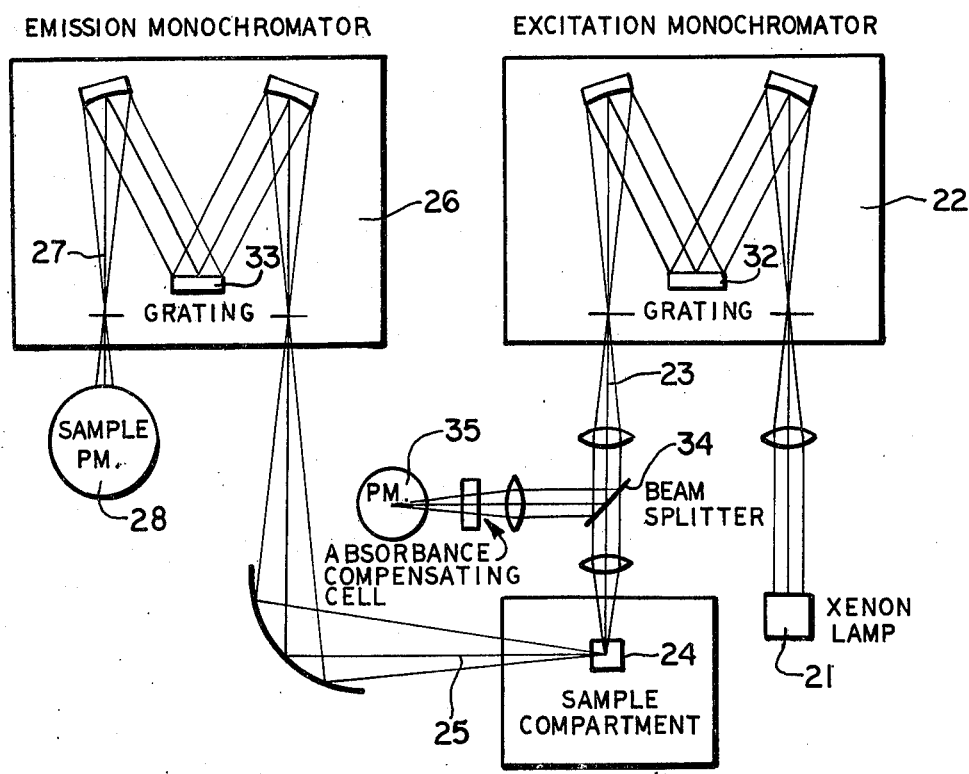
FIG. 2 is a diagrammatic view of the spectrofluorometer of FIG. 1 useful in explaining the operation of the invention.

Referring to the figures, and particularly to FIGS. 1 and 2, a spectrofluorometer 20 for use in conjunction with the present invention comprises a suitable radiation source 21, such as a xenon light source, which furnishes light to an excitation monochromator 22 of the wavelength scanning type from which an excitation beam 23 of selected wavelength is directed to a sample cuvette 24 containing a fluorescing sample. The fluorescent emission beam 25 from the sample is delivered to an emission monochromator 26, also of the wavelength scanning type. The emission output beam 27, which at a given time may comprise a characteristic wavelength in emission beam 25 selected by scanning monochromator 26, is delivered to a photomultiplier tube 28 which generates output current signals indicative of the amplitude of fluorescence of the sample.

The output signal developed by photomultiplier tube 28 is amplified and processed, and then applied to an X-Y plotter 30 of conventional design and construction. This plotter generates on a chart 31 the desired contour plot of the total luminescence spectrum of the sample.

Figure 3:
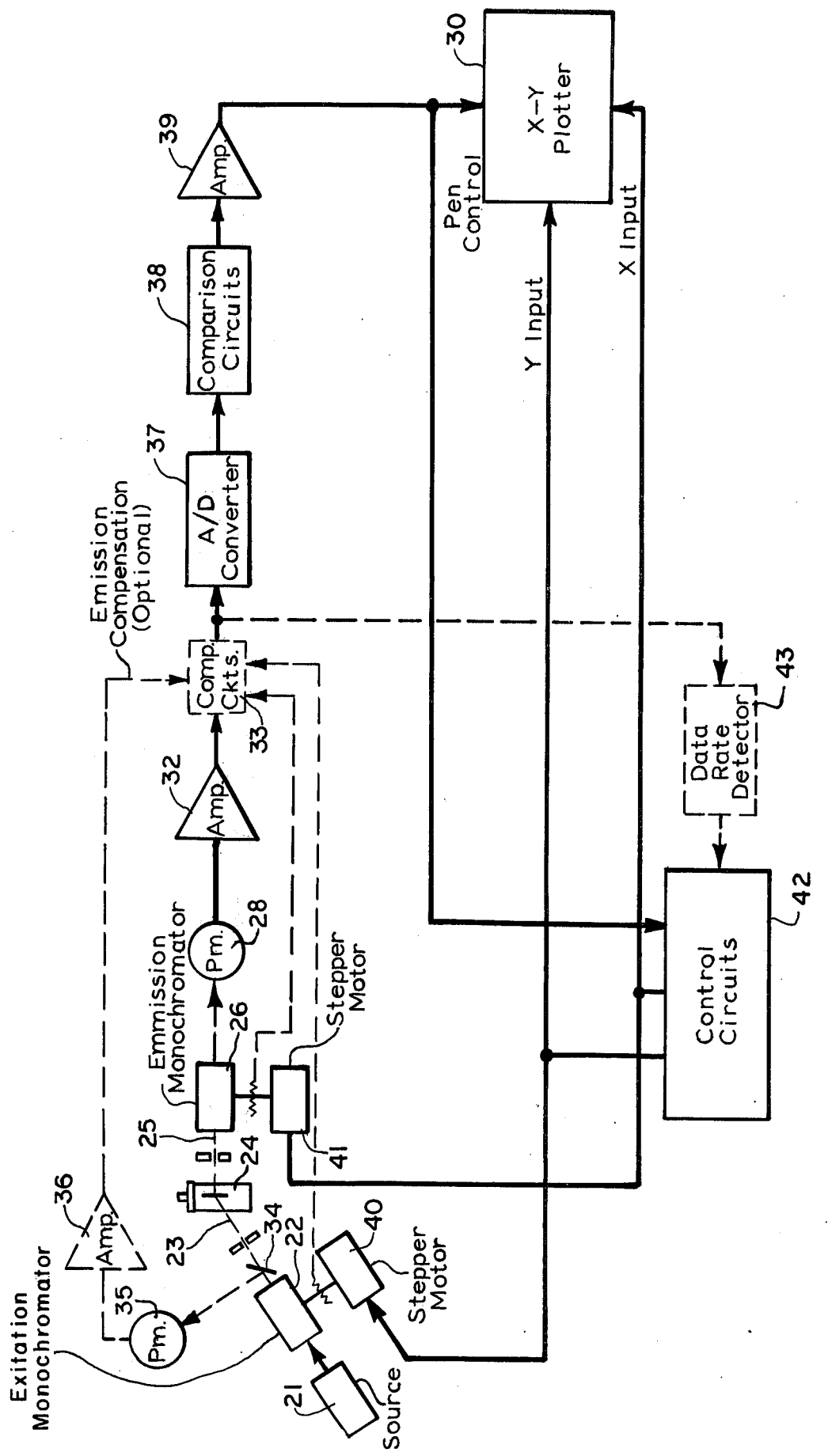
FIG. 3 is a functional block diagram of a system constructed in accordance with the invention for generating a contour plot of the total luminescence spectrum of a sample.

Referring to FIG. 3, the output signal developed by photomultiplier tube 28 is applied to an amplifier 32 wherein it is converted to an analog voltage signal indicative of the fluorescence output of the sample. Filtering circuitry may be incorporated within amplifier 32 to eliminate extraneous signal components in the amplified signal. The filtered signal then may be applied to compensating circuits 33, wherein it is combined with an analog signal developed by the reference photomultiplier tube 35 and amplified in an amplifier 36. This stage functions to compensate for nonlinearities in the system as described in U.S. Pat. No. 3,967,113, which is assigned to the present assignee, and in which the present applicant is named as co-inventor.

The compensated analog ouput signal is applied to an analog-to-digital (A/D) converter 37 wherein it is converted from an analog signal to a binary coded decimal (BCD) signal indicative of fluorescence amplitude. Since only contours are recorded in the desired composite plot, the BCD signal is compared by means of comparison circuits 38 with preset BCD levels representing the desired contour levels, and output signals are developed only upon the occurrence of these specific signal levels. The output signals are amplified in amplifier 39 and applied to the pen control circuit of the X-Y plotter 30.

The operating wavelengths of the excitation and emission monochromators are controlled by means of stepper motors 40 and 41, respectively. These stepper motors are mechanically coupled to the gratings 32 and 33 of the monochromators so that as the motors are stepped the gratings are incrementally rotated to establish new operating wavelengths for the monochromators.

Stepper motors 40 and 41 receive pulses from a control circuit 42, and the same pulses may be utilized by the X-Y plotter 30 to advance the pen therein in synchronism with wavelength changes in the monochromators, as required in generating the contour plots. As the excitation monochromator 40 is advanced one step, the pen of the X-Y plotter is caused to move vertically one division. Similarly, as the emission monochromator stepper motor 41 is advanced one step, the pen of the plotter is caused to advance horizontally one division.

In operation control circuits 42 generate a series of pulses which sweep the emission monochromator through its entire range, while at the same time causing the pen of the X-Y plotter to scan horizontally across the chart 31. Should a desired signal level or contour be encountered at the output of photomultiplier 28 during this sweep, the pen of the X-Y plotter 30 is actuated by amplifier 39 to produce a mark on the chart. At the same time, the control pulse from amplifier 39 is applied to control circuits 42 to cause a momentary hesitation in the application of pulses to stepper motor 41, thus enabling the pen to produce a sharp impression on the chart. Stepping pulses are then resumed and the emission monochromator 26 and the pen of plotter 30 continue to scan until the upper scan limits of each is reached. At this point control circuits 42 momentarily apply pulses to stepper motor 40 to incrementally increase the operating of the excitation monochromator 22. These pulses also serve to vertically reposition the pen of plotter 30 in preparation for another horizontal scan. Pulses are now again applied to stepper motor 41 to sweep the emission monochromator 26 and generate another horizontal plot on the chart. The process continues until the entire contour plot has been formed, at which time the process is stopped so that the user may remove the plot and position the pen for preparation of another plot.

In accordance with another aspect of the invention, the rate at which pulses are generated by control circuits 42 and applied to the stepper motors may be varied as a function of the data rate produced by photomultiplier tube 28. This optional feature is accomplished by means of a data rate detector 43 which differentiates the analog signal developed by photomultiplier tube 28 to obtain a control signal for application to control circuits 42. Since a faster scanning rate may be ultilized when the data rate is low to reduce processing time, the pulse rate is increased upon decrease in the output of detector 43. This insures that an accurate plot will be obtained even when the spacing between contours is minimal.

To further improve plotting efficiency, the scanning of horizontal lines may be terminated short of the wavelength limits of the emission monochromator in those areas of the plot where data is not present, and where the density of the data is not sufficient to warrant full scanning density.

Figure 4:
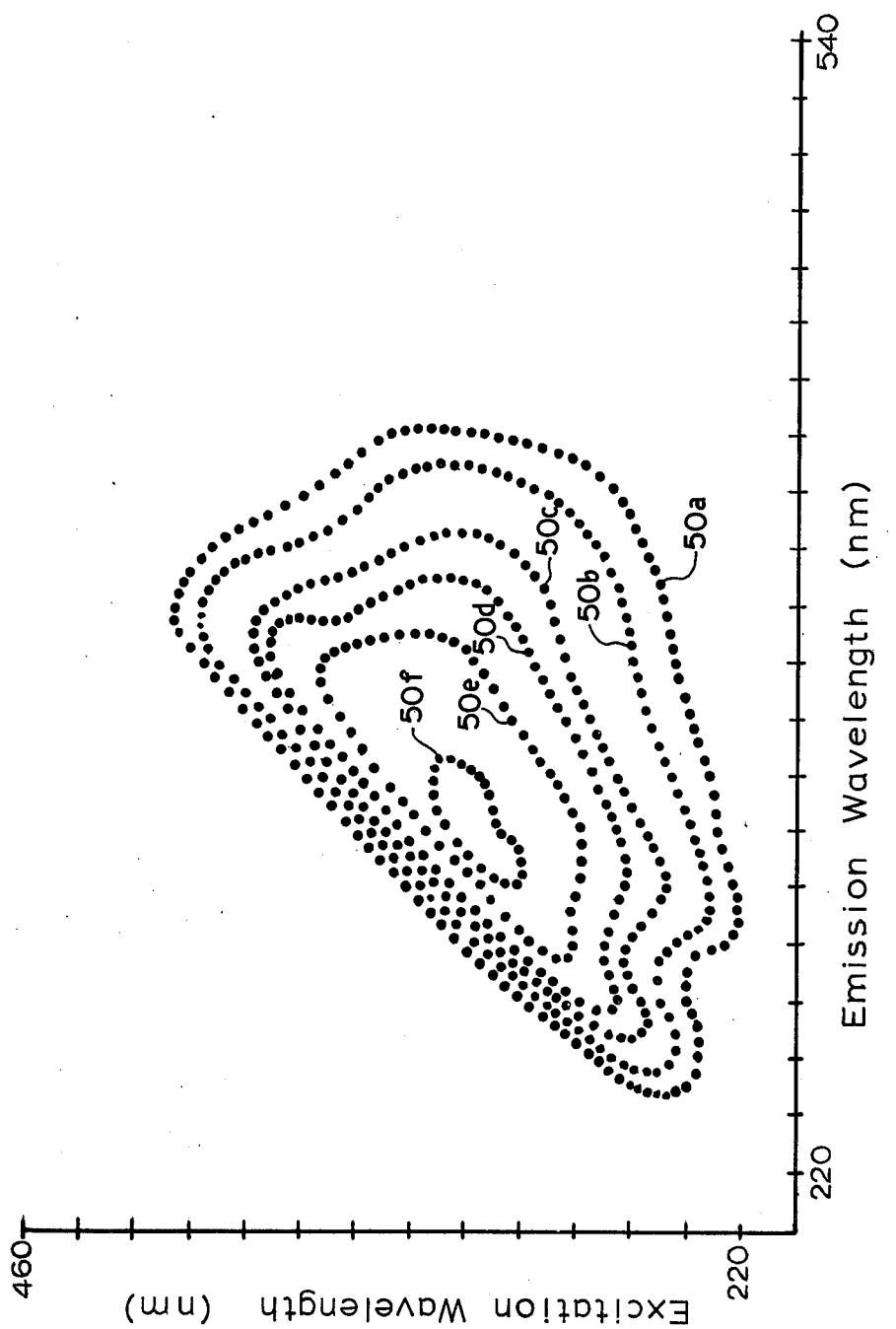
FIG. 4 is; a representative plot of the total luminescence spectrum of a sample as prepared by a system constructed in accordance with the invention.

A representative plot produced by a system and apparatus constructed in accordance with the invention is shown in FIG. 4. Here it is seen that the contours 50a-−50f are produced by a series of closely spaced dots formed as the pen of the plotter traverses the plot along the horizontal scanning lines 51. As the pen moves along these scanning lines, it produces a mark only upon occurrence of one of the desired contour levels. It will be appreciated that the plot can be taken along either horizontal or vertical axis by scanning the appropriate monochromator.

Figure 5:
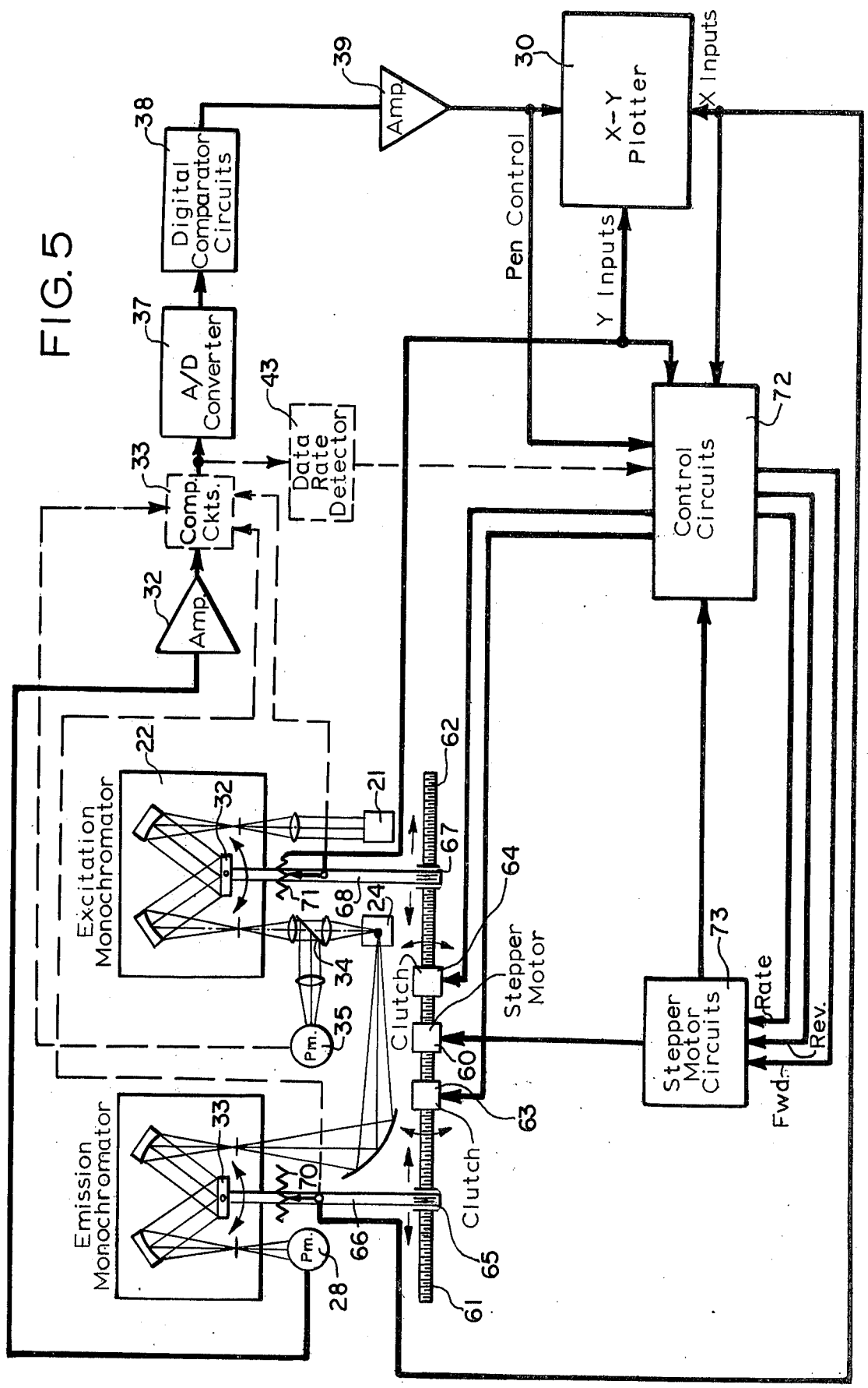
FIG. 5 is a functional block diagram of an alternative system constructed in accordance with the invention for producing a contour plot of the total luminescence spectrum of a sample.

Referring to FIG. 5, the system of the invention is shown in conjunction with the spectrofluorometer having a single stepper motor 60 instead of the separate stepper motors 40 and 41 of the previously described embodiment. The single stepper motor is coupled to lead screws 61 and 62 by electrically-actuated clutches 63 and 64, respectively. Upon receipt of an appropriate signal these clutches serve to couple their associated lead screws to the stepper motor. Lead screw 61 includes a traveler 65 which is mechanically coupled to the grating 33 of the emission monochromator 26 by means of an arm 66. As lead screw 61 turns and follower 65 moves along the lead screw axis, arm 66 repositions grating 33 to change the operating wavelength of monochromator 26. Similarly, lead screw 62 includes a follower 67 which is coupled to grating 32 of excitation monochromator 22 by an arm 68. As follower 67 moves along the axis of lead screw 62, arm 68 repositions grating 32, and hence changes the operating wavelength of the monochromator.

To provide an analog output signal indicative of its position, and hence the operating wavelength of monochromator 26, grating 33 includes analog signal generating means in the form of a potentiometer 70 which produces an output signal for application to the X input of X-Y plotter 30. Similarly, grating 32 of monochromator 22 has associated with it a potentiometer 71 which produces an analog output signal for application to the Y input of plotter 30. In addition to being applied to plotter 30, the position-indicating signals are applied to control circuits 72, wherein they are utilized for controlling the duration of the horizontal and vertical scanning. Control circuits 72 may also receive the output of amplifier 39 to interrupt stepping when the pen is actuated, and the output of the data rate detector 43 is also applied to control the rate of pulse generation.

Control circuits 72 produce forward, reverse and rate control signals for application to stepper motor circuits 73, which generate signals for actuating stepper motor 60, and control signals for operation of clutches 63 and 64. Depending upon the control signals received from control circuit 72, stepper motor 60 may be driven in either a forward or reverse direction, and at a rate called for by the data rate recognized by detector 43.

In operation, stepper motor 60 is operated more or less continuously by stepper motor circuits 73, and clutches 63 and 64 are selectively engaged to cause the emission monochromator 26 to scan, and the excitation monochromator to periodically incrementally increase after each scanning cycle, with corresponding movement of the pen of the X-Y plotter 30. This arrangement has the advantage of allowing a single stepper motor to accomplish positioning of both gratings 32 and 33 at a substantial cost savings. Furthermore, the analog position-indicating signals generated within the spectrofluorometer are utilized to position the pen of the X-Y plotter 30, independently of the application of pulses to stepper motor 60 or the actuation of clutches 63 and 64.

Figure 6:
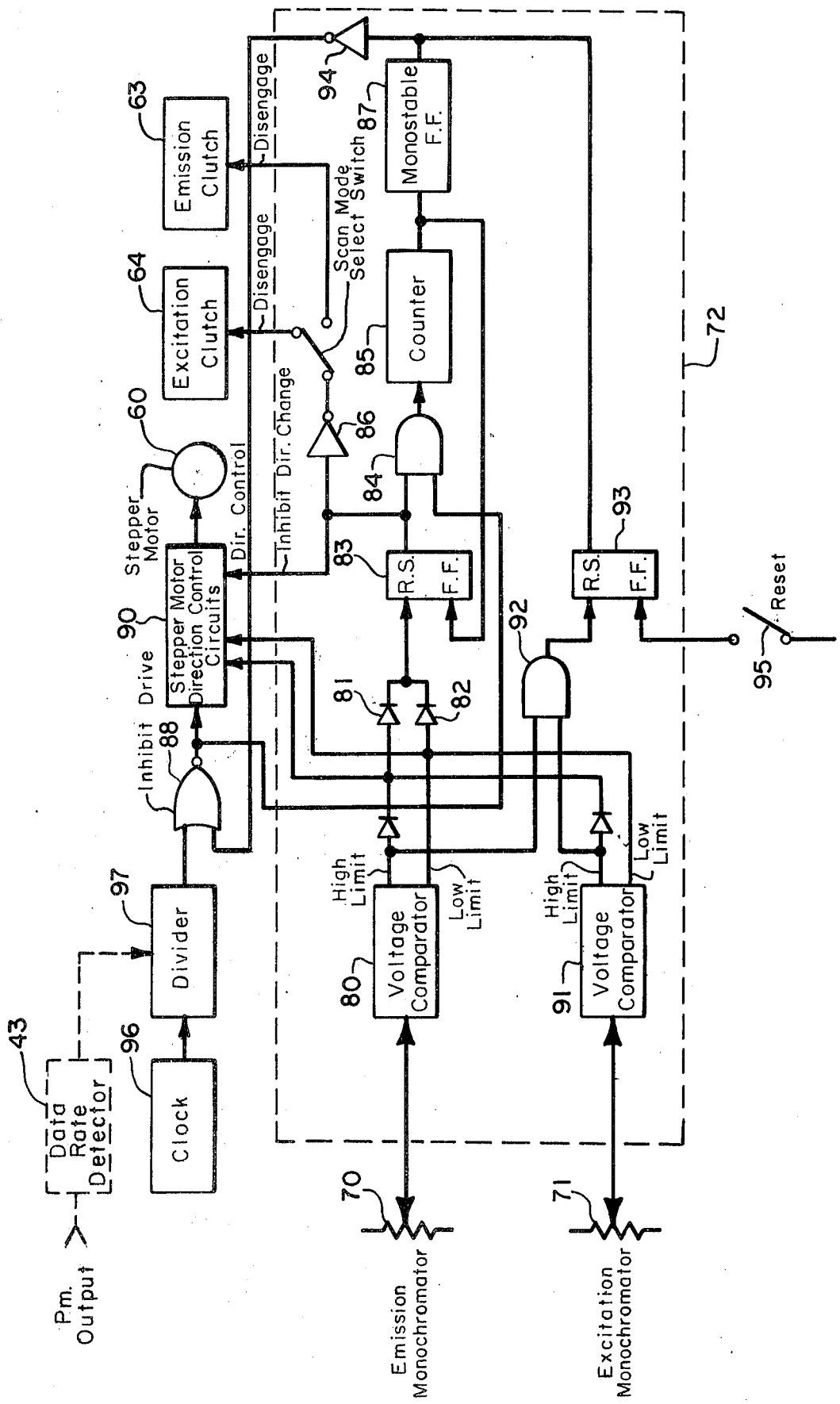
FIG. 6 is a functional block diagram of the control circuitry utilized in the system of FIG. 5.

Referring to FIG. 6, control circuits 72 may include voltage comparators 80 and 91 for detecting preset analog voltage levels indicating that the scanning monochromator has reached the upper and lower limits of its range of operating wavelengths. Upon occurrence of either of these limits, control signals are developed and applied through respective ones of steering diodes 81 and 82 to the set input of an RS flip-flop 83. This causes the production of an output signal which engages the clutch, of the non-scanning monochromator, and enables AND gate 84. Pulses being applied to stepper motor 60 are now applied to a counter 85. When this counter reaches a predetermined counting state representing the number of increments necessary to reposition the non-scanning grating to obtain a desired subsequent operating wavelength for the non-scanning monochromator, the counter produces an output signal which is applied to the reset input of flip-flop 83 to reset that flip-flop and discontinue the application of pulses to the counter. The non-scanning clutch is disengaged through inverter 86 and the scanning clutch remains engaged. The output from counter 85 also triggers a monostable flip-flop 87 which produces a momentary signal for application to a motor inhibiting NOR gate 88. This serves to momentarily interrupt the application of pulses to stepper motor 60 to compensate for delays in actuation of the clutch.

The high and low limits of voltage comparators 80 and 91 are also applied to stepper motor direction control circuits 90 which control the direction of stepper motor 60. Upon the scanning monochromator reaching either limit, the direction of rotation of the stepper motor 60 is automatically reversed to cause scanning in the opposite direction.

Control circuits 72 include a second voltage comparator 91 which senses the analog signal from the excitation monochromator 22 and develops an output signal upon that monochromator reaching its upper wavelength limit. This signal is applied to one input of an AND gate 92. The other input of this gate receives the high limit output signal from voltage comparator 80, and upon occurrence of both signals, gate 92 produces an output which establishes an RS flip-flop 93 in its set state. The output from this flip-flop is applied to the inhibit NOR gate 88 through an inverter 94 to terminate the application of stepper pulses to stepper motor 60 when both the emission and excitation monochromators have reached the upper limits of their scanning ranges. At this point the contour plot has been completed and it is necessary for the operator to remove the plot and manually reposition the pen for a subsequent plot. A manual RESET switch 95 is provided for resetting RS flip-flop 93 to its reset state to reestablish operation of stepper motor 60.

The output of the photomultiplier tube may be differentiated by the data rate detector 43 to control the rate of the pulses applied to stepper motor 60. The pulses for the stepper motor in this case are generated by a clock circuit 96 at a relatively high frequency and divided down to the lower stepping frequency by a divider circuit 97. The output signal from the data rate detector 43 may in this case establish a division factor in divider 97, and hence a pulse rate, appropriate to the rate of the data being generated.

While discrete components have been shown in the control circuits 72 illustrated in FIG. 6, it will be appreciated that the control circuits could also be constructed by utilization of integrated circuitry, including microprocessor components, and that such construction would lend itself to incorporation of various additional functions and features, such as automatic repositioning of the monochromators following completion of a contour plot.

The system of the invention provides a novel and efficient means for generating the contour plot of a total luminescence spectrum of a sample with a minimum of additional components and with minimum modification to existing spectofluorometric apparatus.

While embodiments of the invention have been shown and described, it will be obvious to those skilled in the art that changes and modifications may be made without departing from the invention in its broader aspect. Therefore, the aim in the appended claims is to cover all such changes and modifications as fall within the true spirit and scope of the invention.

I claim:

1. A system for producing a two-dimensional contour plot of the total luminescence spectrum of a sample comprising, in combination:
    excitation means including a monochromator having a variable operating wavelength dependent on applied pulses for generating a source of monochromatic light for application to said sample;
    emission detection means including a monochromator having a variable operating wavelength dependent on applied pulses for generating an output signal dependent on the amplitude of flourescent light emitted from said sample;
    an X-Y plotter including a marking pen responsive to an applied control effect and X and Y axis positioning means;
    synchronization means coupled between said monochromators and said position means for synchronizing the position of said pen on said plotter with the operating wavelength of said monochromators;
    pen control means responsive to the presence of a predetermined level at the output of said emission means for actuating said pen; and
    scanning means for progressively scanning one of said monochromators through a predetermined range of wavelengths, and for incrementally advancing the other of said monochromators upon the completion of each such scan, to form said desired contour plot.

2. An analysis system as defined in claim 1 wherein said monochromators are stepped incrementally upon application of stepping pulses.

3. An analysis system as defined in claim 2 wherein said monochromators are stepped by means of a single stepping motor, said monochromators being mechanically coupled to said stepping motor by means of electrically actuated clutches.

4. An analysis system as defined in claim 1 wherein said stepping pulses are generated at a rate dependent on the rate of data generation by said emission detection means.

* * * * *